(12) United States Patent
Christensen et al.

(10) Patent No.: US 7,979,091 B2
(45) Date of Patent: Jul. 12, 2011

(54) METHOD FOR OPERATING A MOBILE COMMUNICATION DEVICE, SOFTWARE PROVIDED FOR CARRYING OUT THE METHOD, SOFTWARE STORAGE MEDIUM FOR STORING THE SOFTWARE, AND THE MOBILE COMMUNICATION DEVICE

(75) Inventors: Martin Wraber Christensen, Copenhagen (DK); Joakim Korner Nielsen, Aalborg (DK); Christine Broe, Aalborg (DK)

(73) Assignee: Nokia Corporation, Espoo (FI)

( * ) Notice: Subject to any disclaimer, the term of this patent is extended or adjusted under 35 U.S.C. 154(b) by 1314 days.

(21) Appl. No.: 11/469,021

(22) Filed: Aug. 31, 2006

(65) Prior Publication Data

US 2008/0055236 A1  Mar. 6, 2008

(51) Int. Cl.
*H04M 1/00* (2006.01)
(52) U.S. Cl. .................. 455/566; 455/575.1; 455/575.3; 455/575.4
(58) Field of Classification Search .................. 455/566, 455/73; 348/734
See application file for complete search history.

(56) References Cited

U.S. PATENT DOCUMENTS

| 7,386,279 B2 * | 6/2008 | Wagner et al. .................. 455/73 |
| 2004/0135816 A1 * | 7/2004 | Schwartz et al. ............. 345/811 |
| 2005/0212979 A1 * | 9/2005 | Morita et al. ................. 348/734 |

FOREIGN PATENT DOCUMENTS

| EP | 1104151 A2 * | 5/2001 |
| WO | 0065429 A | 11/2000 |
| WO | 03021459 A | 3/2003 |

OTHER PUBLICATIONS

International Search Report dated Dec. 5, 2007.

* cited by examiner

*Primary Examiner* — Charles Shedrick
(74) *Attorney, Agent, or Firm* — Perman & Green, LLP

(57) ABSTRACT

A method of operating a mobile communication device comprising displaying a array of selectable functions in a first direction on a display of the communication device; scrolling through the selectable functions in the array of functions by using one or more navigation keys, wherein for each one of the selectable functions, a respective array of selectable contacts is displayed in a second direction on the display as the selectable functions are scrolled through; scrolling through the selectable contacts of one of the arrays of selectable contacts by using one or more navigation keys; selecting one of the selectable functions and one of the selectable contacts by halting the scrolling in the first and second directions at selected positions; and executing the selected function for the selected contact by a single user command.

30 Claims, 9 Drawing Sheets

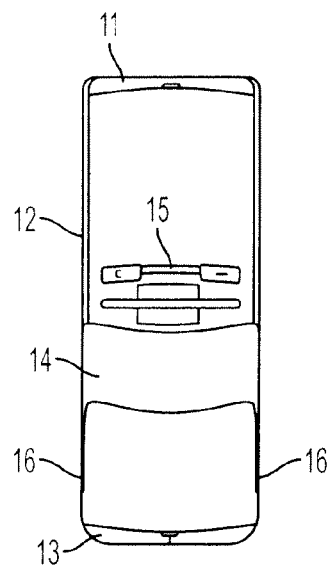
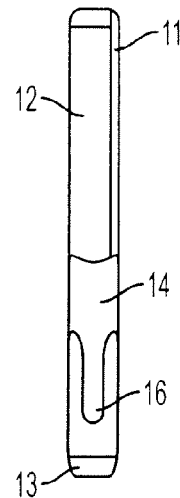
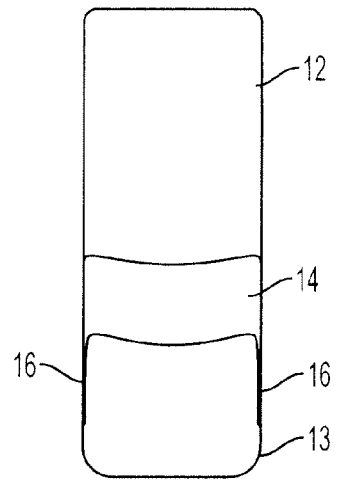
FIG. 1A     FIG. 1B     FIG. 1C
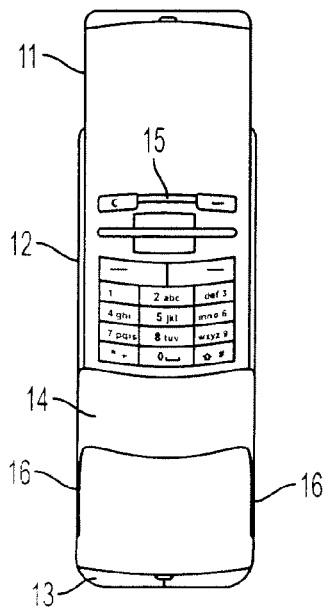
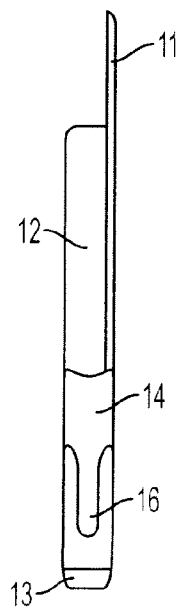
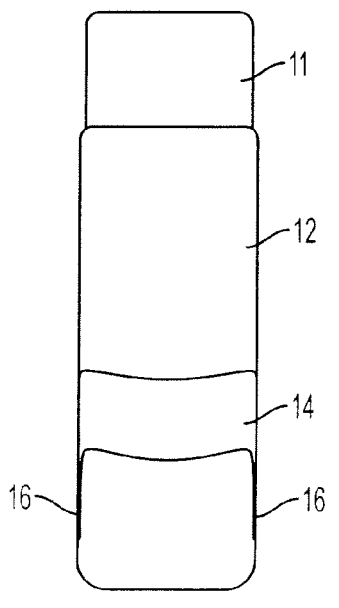
FIG. 2A     FIG. 2B     FIG. 2C

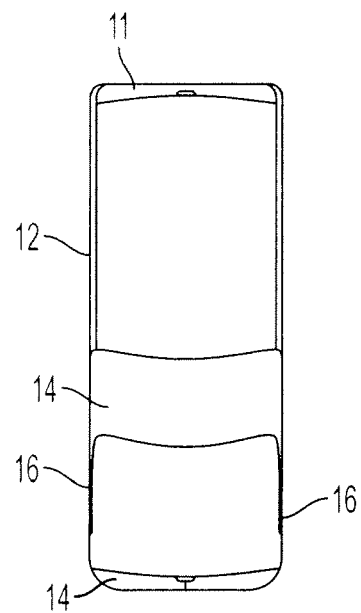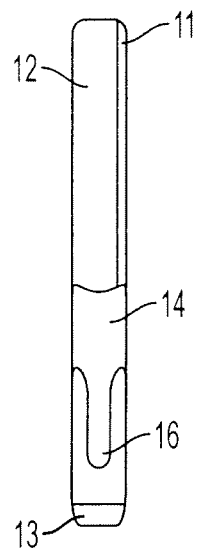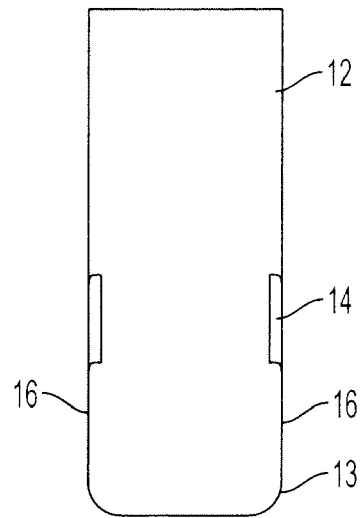
FIG. 3A   FIG. 3B   FIG. 3C
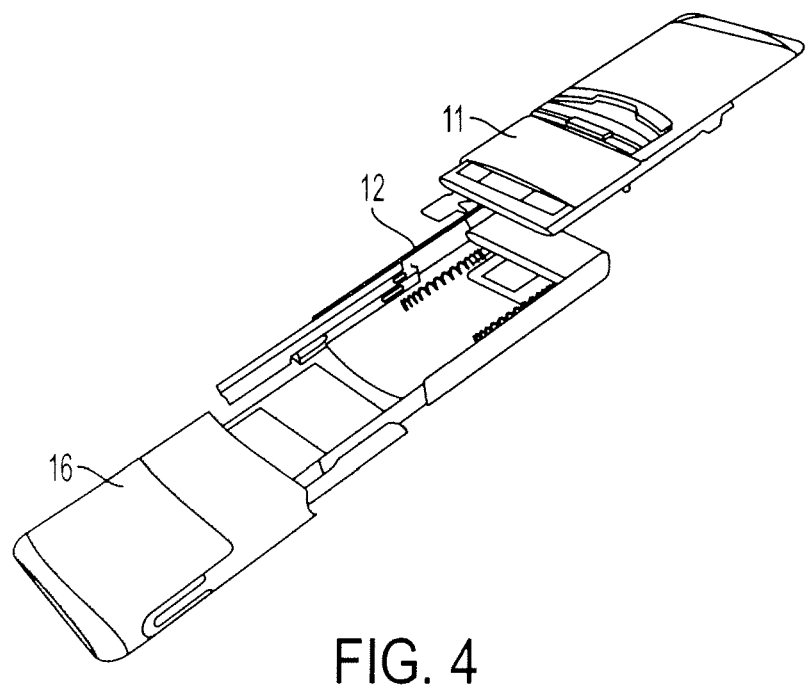
FIG. 4

METHOD FOR OPERATING A MOBILE COMMUNICATION DEVICE, SOFTWARE PROVIDED FOR CARRYING OUT THE METHOD, SOFTWARE STORAGE MEDIUM FOR STORING THE SOFTWARE, AND THE MOBILE COMMUNICATION DEVICE

TECHNICAL FIELD

The disclosed embodiments relate to mobile communication devices and their operation. The disclosed embodiments relate particularly to the operation of their user interfaces in order to obtain simplified presentation, selection and/or execution of functions of the mobile communication devices.

BACKGROUND

Devices such as mobile communication devices have user interfaces, which allow their users to receive information relating to the status of the devices and to control various functions of the mobile communication devices. For example, the user interface may present information in the form of a menu of available options, which allows the user to scroll through a list of headings, each of which may provide access to a list of sub-headings or available features, eventually selecting a desired feature.

As the mobile communication devices have become more and more complex, also their user interfaces have become more and more complex. The information presented to the user may be extensive and as a consequence the user may experience difficulties in navigating through the information in order to find information relating to the status of the device and to control various functions.

Concurrently, the mobile communication devices have become smaller and smaller, which means that the size of their graphical user interfaces, i.e. displays, are limited, making the presentation of information yet harder.

Therefore the menu structures of the user interfaces have become more complex with more hierarchical levels, which implies that finding information and controlling functions are not only more difficult, but also more time-consuming. To find a piece of information or to control a single function may involve several interactions between the user and the mobile communication device.

SUMMARY OF THE INVENTION

In one embodiment a method of operating a mobile communication device is provided, by which information is easier to find and by which functions are easier to control.

It is in this respect, in one embodiment a method is provided, which, by combining and presenting information in a novel manner, provides for a simpler and faster handling of the mobile communication device.

In another embodiment, a method is provided, which minimizes the use of numerous menus to select from.

In still a further embodiment, a method is provided, by which access to basic information and basic functionality is particularly simplified.

In yet a further embodiment a method is provided, which is flexible, reliable, and user-friendly.

There are still further embodiments that provide a computer program product and a mobile communication device, respectively, which implement a method and provide a software storage medium provided for storing software, which implements the method.

According to a first aspect of the invention there is provided a method of operating a mobile communication device, wherein an array of selectable functions is displayed in a first direction on a display of the communication device; the selectable functions in the array of functions are scrolled through by using one or more navigation keys; a respective array of selectable contacts is displayed for each one of the selectable functions in a second direction on the display as the selectable functions are scrolled through; the selectable functions of one of the arrays of selectable contacts are scrolled through by using one or more navigation keys; one of the selectable functions and one of the selectable contacts are selected (or highlighted or indicated) by halting the scrolling in the first and second directions at selected positions; and the selected function for the selected contact is executed by a single user command.

According to a second, a third, and a fourth aspect of the invention there are provided a computer program product comprising software code portions for performing the method of the first aspect of the invention; a software storage medium provided for storing the computer program product; and a mobile communication device provided for performing the inventive method or which comprises the inventive computer program product of software storage medium.

The disclosed embodiments provide for an improved operation of the mobile communication device. The menu structure facilitates the handling and provides more intuitive, easily understandable, and faster operation.

Traditionally, the selection of a call service and of a message service would have been a two-menu process. The inventive two-directional menu of the present invention provides merging of primary and subordinate or secondary levels of user selectable functions/items into one level, thereby eliminating the need of a two-menu process.

Further characteristics and advantages thereof will be evident from the following detailed description of the embodiments and the accompanying FIGS. 1-10, which are given by way of illustration only, and thus are not limitative of the disclosed embodiments.

BRIEF DESCRIPTION OF THE DRAWINGS

FIGS. 1-4 illustrate, schematically, a mobile communication device according to an embodiment of the present invention.

FIGS. 1*a-c* illustrate the device in front, side, and back elevation views in a first or ready state;

FIGS. 2*a-c* illustrate the device in front, side, and back elevation views in a second or active state;

FIGS. 3*a-c* illustrate the device in front, side, and back elevation views in a third or standby state; and FIG. 4 illustrates housing parts of the device in an exploded view.

DETAILED DESCRIPTION OF EMBODIMENTS

Figure 5:
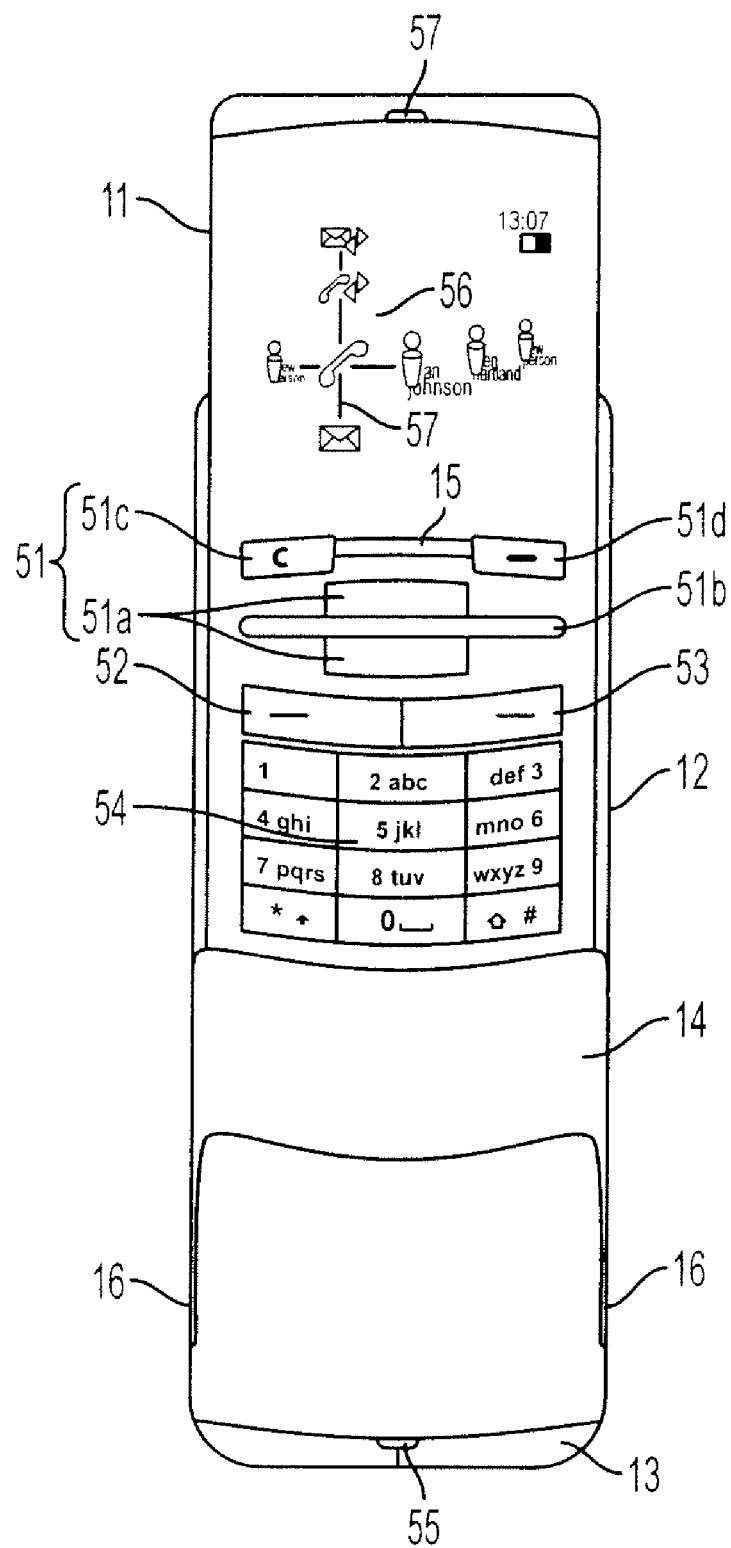
FIG. 5 illustrates, schematically, the mobile communication device in the second or active state in greater detail.

With reference to FIGS. 1-4, a mobile communication device of an embodiment of the present invention has a product architecture divided into three main parts—an interaction part 11, a first base part 12, and a second base part 13. The interaction part 11 slides in the first base part 12 and the first base part 12 slides in the second base part 13 to thereby transform the mobile communication device between three different physical as well as operational states during use.

FIGS. 1a-c illustrate the device in a first or ready state, FIGS. 2a-c illustrate the device in a second or active state, and FIGS. 3a-c illustrate the device in a third or standby state.

The active state is reached from the ready state by sliding the interaction part 11 upwards, e.g. by pushing a protrusion known as a push bump 15 upwards by a thumb or similar. Similarly, the ready state is reached from the active state by sliding the interaction part 11 back. The movement between the ready and active states is associated with different operational actions of the mobile communication device, which will be further described below.

The third or standby state is reached from the ready state by pressing the first 12 and second 13 base parts together. The pressing together is made achievable by pressing two release buttons 16 on the sides of the mobile communication device thereby activating a release mechanism. During the pressing together, the first base part 12 slides, together with the interaction part 11, into the second base part 13, while a flexible rubber section 14 is compressed, until a locked position is reached. The compression of the rubber section 14 is easily seen in FIG. 3b. In order to transform the mobile communication device back to the ready state the two release buttons 16 are pressed to once more activate the release mechanism, and the ready state is automatically reached: the mobile communication device extends oneself in a smooth movement caused by the flexible rubber section 14, while returning to its decompressed condition. The movement between the ready and standby states is associated with different operational actions of the mobile communication device, which will be further described below.

FIG. 4 illustrates the interaction part 11 and the first 12 and second 13 base parts in an exploded view. The interaction part 11 comprises, inter alia, several parts of a user interface of the mobile communication device: input keys, a display, and an earpiece. The first base part 12 comprises an RF unit, an antenna, and a loudspeaker; and the second base part 13 comprises baseband circuitry, the above mentioned release mechanism, a battery, a SIM-card cradle and remaining parts of the user interface: a microphone and optionally a vibrator. It shall, however, be appreciated that the division of the components among the parts 11, 12, and 13 may alternatively be made in a plurality of other manners.

FIG. 5 illustrates main parts of the user interface in more detail. The user interface comprises input devices such as navigation keys 51; a no/end key 53; an OK/send key 53; alphanumeric keys 54; and the above mentioned microphone 55. The navigation keys 51 include up/down navigation keys 51a, a horizontal navigation key 51b, a cancel key 51c, a soft key 51d, and the push bump 15. The output devices comprise the display 56 and the earpiece 57.

The mobile communication device is provided with software for displaying a two-directional menu 58 on the display 56, which represents a novel composition with a novel principle of interaction. It provides the user with immediate navigation, which is strongly linked to a physical interaction. The user navigates through two perpendicular arrays containing selectable functions and selectable contacts. In the vertical array the user selects a function, e.g. call or message, and in the horizontal array the user selects a contact (or a particular function, which will be described below). By transforming the mobile communication device into the active state by aid of the push bump 15 the selected combination is executed (details will be given below). Hereby, also the transformation of the mobile communication device constitutes part of the input user interface of the mobile communication device. The invention provides tangible use and immediate software interaction. In the following, these interaction aspects will be disclosed in detail.

Figure 6A:
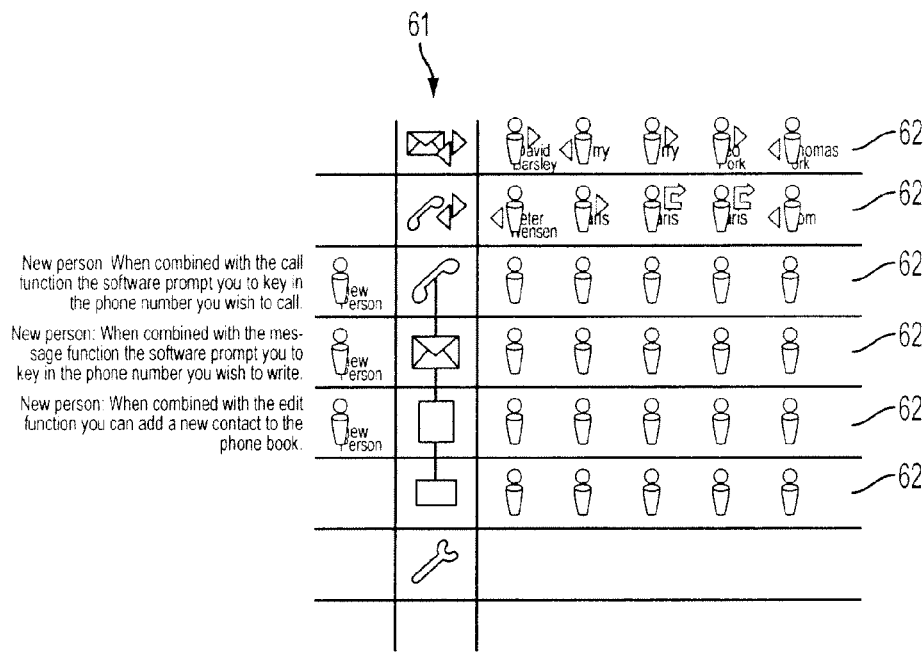
FIG. 6*a* illustrates, schematically, a software structure as used for displaying a two-directional menu on a display of the mobile communication device of FIGS. 1-5.
Figure 6B:
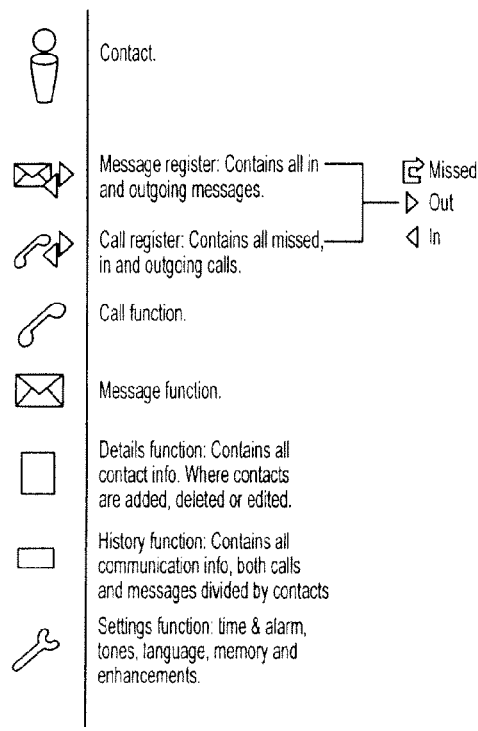
FIG. 6*b* is a table of icons and their description as used in the menu structure of FIG. 6*a*.

FIG. 6a illustrates, schematically, a software structure as used for displaying the two-directional menu 58 on the display 56 of the mobile communication device and FIG. 6b is a table of icons and their description as used in the menu structure.

The software structure is a two-dimensional matrix, through which the user may scroll or navigate using the up/down navigation keys 51a and the horizontal navigation key 51b. By using the up/down navigation keys 51a vertical scrolling or navigation is achieved and by pressing or sliding over left-hand and right-hand sides of the horizontal navigation key 51b horizontal scrolling or navigation is achieved. The navigation keys may be exchanged for joystick, track ball, roller or other control devices (none of which being shown here). Touch screen functionality may alternatively be used.

By vertical scrolling a function is selected from a vertical array 61, e.g. a message register containing incoming and outgoing messages, a call register containing missed, incoming and outgoing calls, a call function, a message function, a details function allowing contacts to be added, deleted, and edited, a history function containing communication (calls and messages) information divided by contacts, and a settings function allowing e.g. time, alarm, ring tones, and language to be set. The functions may be divided into basic and advanced functions, e.g. the first four functions may be basic functions and the latter three functions may be advanced functions.

Further functions such as a music playing function, a radio receiver function, and a picture shooting function may be provided. Similarly several separate message functions such as e.g. SMS, MMS, facsimile, and e-mail message functions, may be provided.

To avoid being limited to a default telephone number and/or the complexity of selecting telephone number in a further menu for the call function, there may be provided separate functions for calling mobile and fixed-line or wire telephone numbers and/or for calling work telephone numbers and private telephone numbers.

By horizontal scrolling a contact is selected from one of a plurality of horizontal arrays 62. For the functions call, message, details, and history the contacts are preferably arranged in alphabetical order, whereas for the message and call registers, the contacts are preferably arranged in temporal, i.e. chronological, order with the last incoming or outgoing message and the last missed, incoming or outgoing call first.

Each function and each contact are visualized by a respective icon as shown in the Figures. When the mobile communication device is turned on or activated after having not been used for some time, the call function (or other function) may be selected as default. Either the first contact in the list of contacts for the call function or no contact at all may be selected as a default setting.

Typically, the array 61 of functions and one of the arrays 62 of contacts is displayed at a time, i.e. the array 62 of contacts belonging to the selected function. However, in an alternative version a two-dimensional matrix such as the one depicted in FIG. 6*a* is actually displayed, possibly with the array 62 of contacts belonging to the selected function differentiated from the other arrays of contacts. When the settings function is selected, no row of contacts is displayed.

Typically, the function and contact icons are moved during scrolling and a function is selected by moving its icon vertically to a particular position of the display, i.e. the position at the intersection of the vertical and horizontal arrays as shown e.g. in FIG. 5. Similarly a contact is selected by moving it to the intersection position during the horizontal scrolling. Alternatively a function and a contact are selected by highlighting them or by marking them in any other manner, i.e. by a cursor or the like. The term selection as used in the present context should thus be understood as differentiating them from other functions and contacts. Subsequent to this, a function is executed based on the selected function and contact by means of a further user command.

Further, the scrolling may be closed ended or open ended or cyclic (so that an "endless" circular scrolling is enabled). Such cyclic scrolling may be enabled in one direction only, e.g. to the right in FIG. 5.

When having selected a basic function and a contact, the function is executed with respect to the contact by transforming the mobile communication from the ready state into the active state by aid of the push bump 15. If the function is the call or call register function the selected contact is called and if the function is the message or message register function, message editor is opened with the selected contact as addressee allowing the user to prepare and send the message.

This two-directional menu structure thus solves the problem of going in and out of menu levels, i.e., going between a first and a second level, back and forth, by merging the menu levels into one level thereby offering selection of functions and contacts simultaneously in a single menu. The advantage is that there is only one level, i.e. one user interface menu, which the user needs to relate to, thereby providing a faster and simpler navigation, selection and operation process.

It shall be appreciated that the message function may comprise several message services such as e.g. SMS, MMS, facsimile, and e-mail services. In such instance there may be provided possibilities to define a default message function for each contact that should be used in the above process if more than one message address is specified for the contact.

Similarly, the call and message functions may be merged to one single call/message service and in such circumstances there may be provided possibilities to define a default action (i.e. call or message) for the call/message function for each contact that should be used in the above process. If the message function is an SMS, MMS, or combined SMS/MMS function, the default action can be defined also in case the contact only contains a single mobile telephone number since the mobile telephone number constitutes the address for both a call and an SMS/MMS message.

Generally, if there are several actions that can be performed for a single command, i.e. placing a fixed-line telephone call, placing a mobile telephone call, opening an SMS editor, opening an MMS message editor, opening a combined SMS/MMS editor function, opening a facsimile message editor, opening an instant messaging editor and/or opening an e-mail message editor, each being associated with a respective address type, i.e. a fixed-line telephone number, a mobile telephone number, an instant messaging address and/or an e-mail address, they could be put in a priority order as a user setting for a group of contacts. Then, the single command triggers one of the actions to be performed with respect to a selected contact, where the action to be performed is the action of highest priority that can be performed with respect to the contact, i.e. that is associated with an address type, which is among the address type or types associated with the addresses of the selected contact. For example, if the priority order is selected to be: opening an SMS editor, placing a fixed-line call, placing a mobile phone call, and opening an instant messaging editor in falling order, the action to be performed in response to the single command is opening the SMS editor provided that the selected contact has a mobile telephone number. If the selected contact only has a fixed-line telephone number, a facsimile number, and an e-mail number, the action to be performed in response to the single command is placing a fixed-line call to the selected contact.

Some users, i.e. young user, almost never make telephone calls; they almost solely send messages. Therefore, some models of mobile communication devices may contain a general user setting to allow the opening of SMS editor instead of placing a call as default. The user may then adjust some contacts so that the preferred channel of communication is voice.

A mobile communication device containing a prior art list of contacts, from which a user may select a given contact and then place a call by pressing a call, OK or send button, may thus be adjusted according to this aspect of the invention so that the default function will be to open a message editor instead.

If the user wants to call the person, this would be possible through an option list displayed in response to a user command after having selected the contact in the lists of contacts.

The remaining functions in the list of functions 61 of FIG. 6*a* are advanced functions and can preferably only be selected when the mobile communication already is in the active state. In the ready state these functions may be differentiated, e.g. shadowed, or not displayed at all.

For the functions call, message, and detail a new person contact is provided at the left-hand side of the vertical function list when the mobile communication device is turned on or activated. Choosing this contact and the call function the software prompts, upon transformation of the mobile communication device to the active state, the user to key the telephone number the user wants to call. After this the call can be placed by pressing the OK/send key.

Similarly, choosing the new person contact and the message function the software prompts, upon transformation of the mobile communication device to the active state, the user to key the telephone number, to which the user wants to send a message. Thereafter the message can be prepared and subsequently transmitted in any known fashion.

If the message function contains separate message functions such as e.g. SMS, MMS, facsimile, and e-mail message functions, the mobile communication device may have a default setting to run a message application of either one of the message functions upon transformation of the mobile communication device to the active state.

If the call and message functions is merged to one single call/message service as depicted above, the mobile communication device may have a default setting to either place a call or to open a message editor upon transformation of the mobile communication device to the active state.

If the new person contact and the details function are selected, and the combination is executed, e.g. by pressing the OK/send button 53, the software adds a new contact to the list of contacts and the contact is opened allowing the user to fill in the contact.

When having selected a particular contact first and having thereafter scrolled upwards to the call register there may be different options on how to handle the scrolling. If the particular contact exists in the call register, it may be selected automatically, and if not, the first contact in the list may be selected or no contact at all may be selected. Alternatively, the first contact in the list is selected or no contact at all is selected. When having selected a particular contact in the message or call register, this particular contact is preferably kept selected when scrolling down to any of the functions call, message, details, and history.

To answer a call the mobile communication device is transformed to the active state. If the user does not want to answer the call the cancel key is pressed. If the mobile communication device is equipped to receive a number presentation, the calling party can be identified before determining whether the call should be answered or not.

Figure 7A:
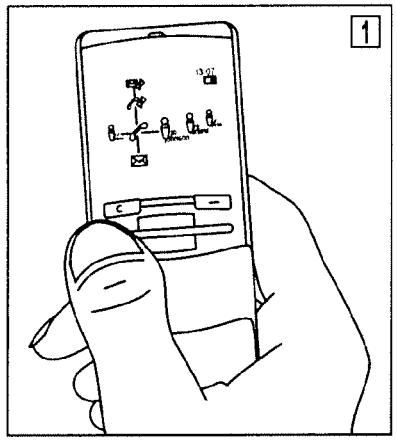
FIGS. 7*a-d* illustrate, schematically, a user interface of the mobile communication device of FIGS. 1-5 at various stages during the process of placing a call.
Figure 7B:
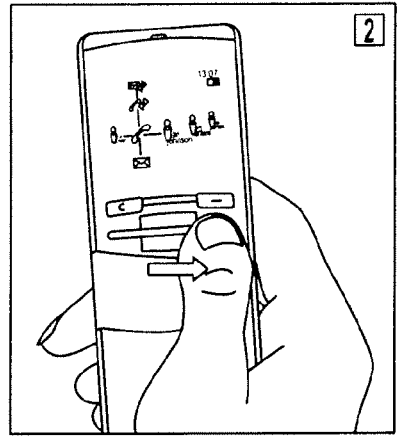
Figure 7C:
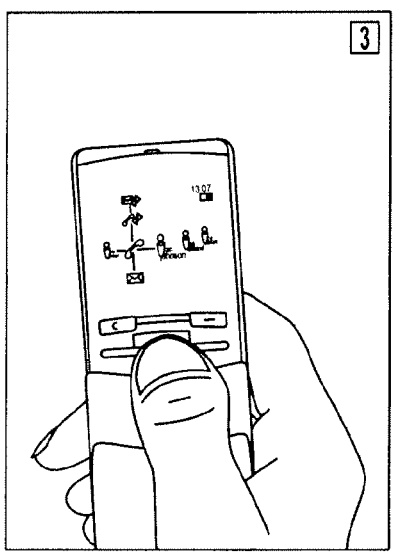
Figure 7D:
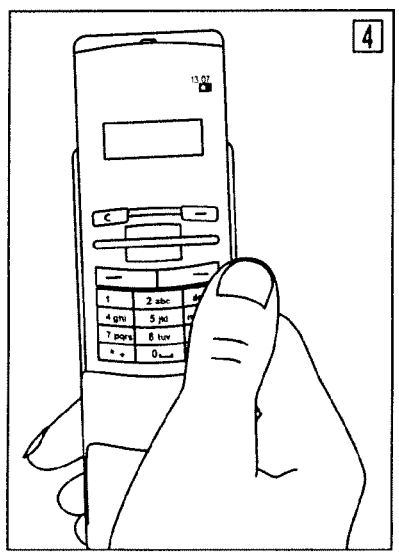

To place a call the user may perform in the manner described below with reference to FIGS. 7*a*-*d*, which illustrate, schematically, the user interface of the mobile communication device at various stages during the process of placing of the call. The call function is selected whereupon the list of contacts appears as a row to the right of the call function icon. This stage of the process is shown in FIG. 7*a*. Then, the horizontal navigation key is used to scroll among the contacts of the contact list as shown in FIG. 7*b*. When a particular contact is selected, this contact is shown at the intersection of the horizontal and vertical bars. In the illustrated case the contact "Alan Johnson" is selected. This stage is illustrated in FIG. 7*c*. Finally, the call is placed by transforming the mobile communication device to the active state as shown in FIG. 7*d*.

It shall be appreciated that the software of the mobile communication device provides for scrolling of functions and contacts in any order, e.g. the above call my be placed by first choosing the contact by horizontal scrolling and then choosing the function, i.e. the call function, by vertical scrolling—all in a single menu.

Figure 7E:
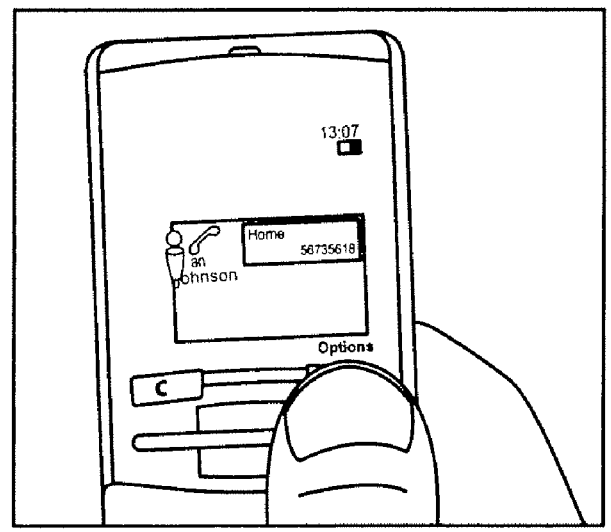
FIGS. 7*e-f* illustrate, schematically, special functions of the user interface of the mobile communication device of FIGS. 1-5.

FIG. 7*e* illustrates a particular function, which is optionally implemented. When scrolling through the list of contacts the soft key 51*d* provides the possibility to select other telephone numbers than a default telephone number for a given contact if such telephone numbers exist. If other telephone numbers than the default telephone number exist a drop-down list or a pop-up window is shown upon pressing the soft key 51*d* and another telephone number can be selected. The scrolling through the list of alternative telephone numbers may e.g. be performed by pressing the soft key 51*d* repeatedly.

Figure 7F:
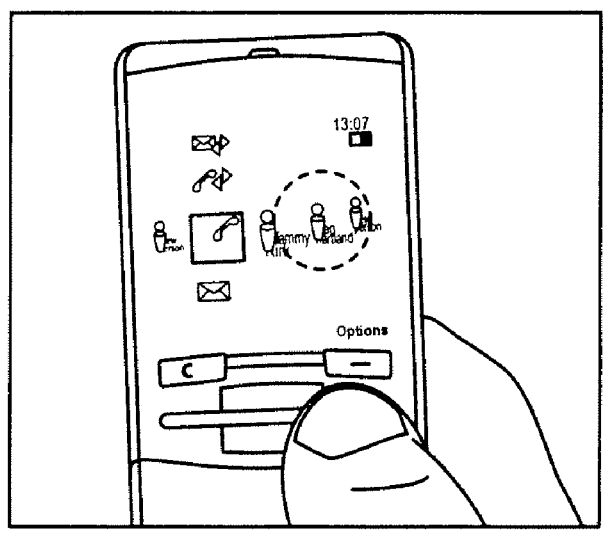

FIG. 7*f* illustrates another function, which is optionally implemented. When scrolling through the list of contacts some of the contact icons may be differentiated in appearance e.g. by a background glow to indicate that these contacts are frequently called contacts. The software may be provided for registering the call pattern constantly and can thereby automatically adjust the differentiation of the contact icons to match the current pattern.

Figure 8A:
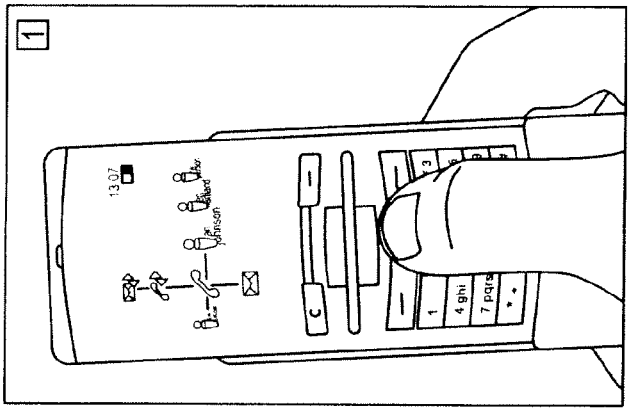
FIGS. 8a-c illustrate, schematically, the user interface of the mobile communication device of FIGS. 1-5 at various stages during the process of preparing and sending a message.
Figure 8B:
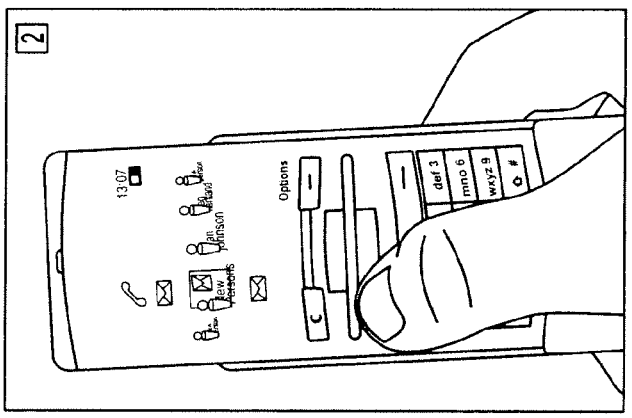
Figure 8C:
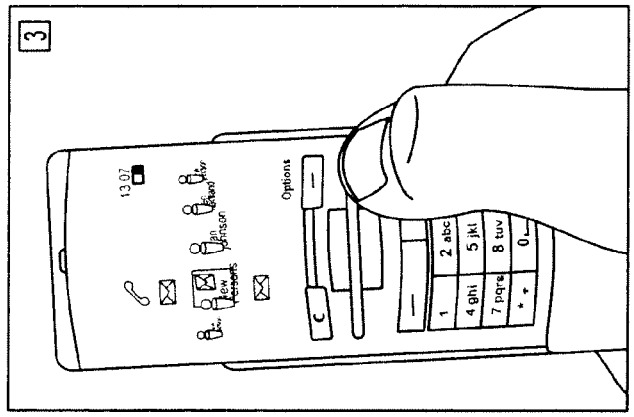

To prepare and send a message, the user may perform in the manner described below with reference to FIGS. 8*a*-*c*, which illustrate, schematically, the user interface of the mobile communication device of FIGS. 1-5 at various stages during the process of preparation and transmission of the message. The horizontal navigation key is used to scroll among the contacts of the contact list as is shown in FIG. 8*a*. When a particular contact is selected this contact is shown at the intersection of the horizontal and vertical bars. In the illustrated case the contact "Alan Johnson" is selected. However, the message function has not been selected yet. Actually the call function icon is located at the intersection of the horizontal and vertical bars. The vertical navigation keys are used to scroll among the functions and in FIG. 8*b* is shown a stage, in which the message function has been selected, and is thus located in the intersection of the horizontal and vertical bars. Finally, the message application is launched by transforming the mobile communication device to the active state as is shown in FIG. 8*c*. As a result a message editor is shown on the display and a message can be prepared using the alphanumerical keys. When the message has been prepared it is sent to the selected contact by pressing the OK/send key. Obviously, the function can be selected before the contact as was described with reference to FIGS. 7*a*-*d*.

Figure 9A:
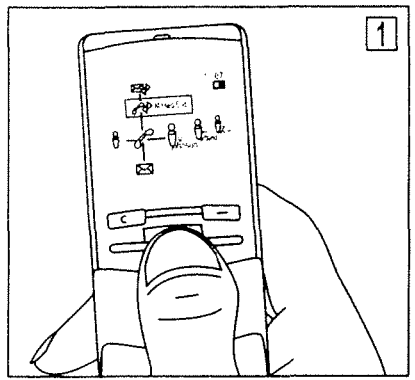
FIGS. 9a-d illustrate, schematically, the user interface of the mobile communication device of FIGS. 1-5 at various stages during the process of calling back a missed call.
Figure 9B:
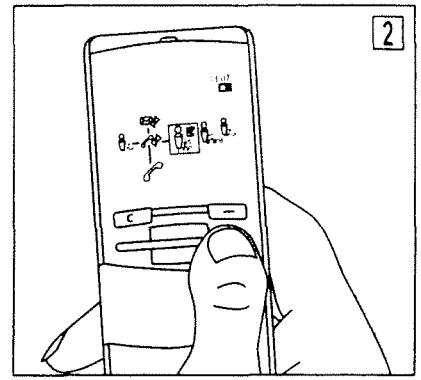
Figure 9C:
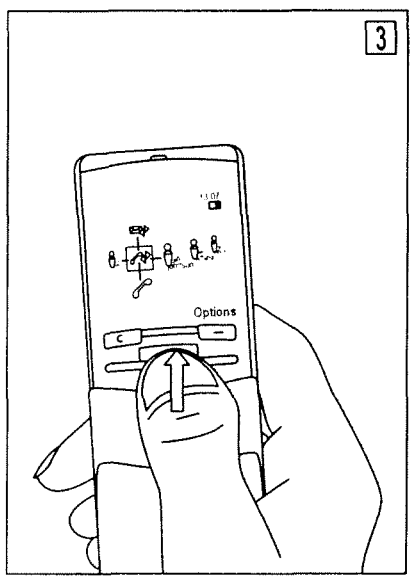
Figure 9D:
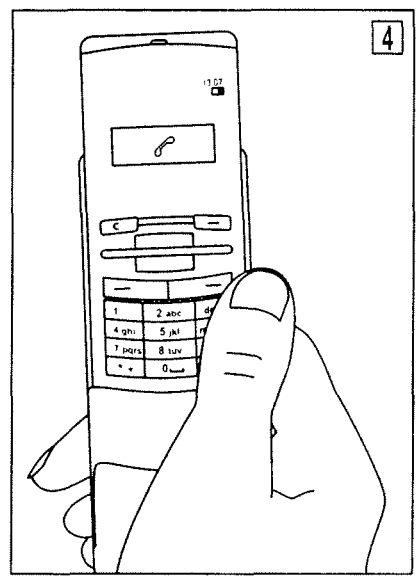

All missed calls are registered and can be found under the call register function. To indicate that there exists a new missed call, the call register icon is differentiated e.g. by an animated frame such as a glowing edge and there is displayed a text informing the user of how many missed calls there are. FIG. 9*a* illustrates schematically the user interface of the mobile communication device at this stage. The differentiation of the icon and the text are displayed until the user executes the call register function, whereupon a list of contact icons with a call history including the contacts with missed calls is displayed in the horizontal array. If there is more than one missed call from a single contact, a contact icon for that contact may appear at several positions in the list, which is, as described above, ordered chronologically. To call back a missed call, the user scrolls horizontally as shown in FIG. 9*b* until he/she finds the contact icon associated with the missed call. When the contact icon is located at the intersection of the horizontal and vertical bars as shown in FIG. 9*c* the call is placed by transforming the mobile communication device to the active state. In FIG. 7*d* the mobile communication device is in its active state and the display shows the action being performed.

The physical appearance of the mobile communication device when transformed into the active state is suitable for the call and message preparing functionality: the device becomes longer to provide a distance between the earpiece 57 and the microphone 55 that is approximately adapted to the distance between the ear and the mouth of a user. Further, the no/end key 53, the OK/send key 53, and the alphanumeric keys 54 are exposed when the interaction part 11 slides out from the first base part 12 so that they can be used e.g. for preparing a message.

The functionality of adding a new contact to the list of contacts is found in the details function. Since this function is an advanced function the user has to start with transforming the mobile communication device to the active state without having selected a combination of a function and a contact as shown in FIG. 10*a*. The user scrolls through the list of functions by using the up/down navigation keys to select the details function and scrolls through the list of contacts by using the horizontal navigation key to select the new person function. When the details function and the new person contact is located at the intersection of the horizontal and vertical bars as shown in FIG. 10*b*, a form for adding a new person to the lists of contacts is displayed by pressing the OK/send key 53.

Figure 10C:
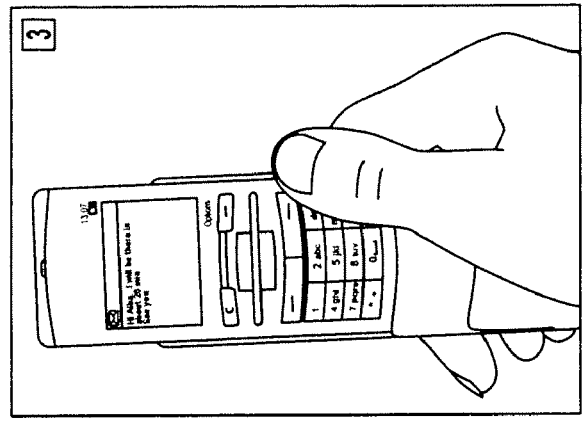
FIGS. 10a-c illustrate, schematically, the user interface of the mobile communication device of FIGS. 1-5 at various stages during the processes of adding a new person to a list of contacts and of opening an existing contact.
Figure 10B:
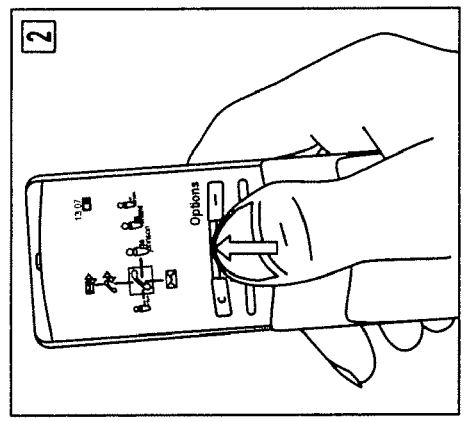
Figure 10A:
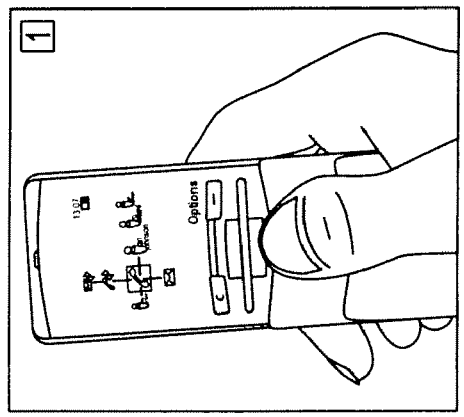

If on the other hand an existing contact is selected as shown in FIG. 10*c* ("Alan Johnson"), this contact is opened by pressing the OK/send key 53. When opened the user may use the soft key to select between editing the contact and deleting it.

Next, the functionality of the third transformation state, the standby state, of the mobile communication device will be overviewed. As can be seen from FIGS. 1-3, the mobile communication device becomes smaller or more compact, i.e. shorter, when being transformed to the standby state. Further, the flexible rubber section 14 is slided over the navigation keys 51 to protect them. The no/end key 53, the OK/send key 53, and the alphanumeric keys 54 are being covered and protected by the interaction part 11 in this as well as in the ready state.

Preferably, the mobile communication device is set to a standby mode when being transformed to the standby state. The standby mode indicates that the device is not being capable of being used. No calls or messages will be received, no calls can be placed, and no messages can be sent. (The RF functionality may or may not be switched off.) When the mobile communication device is transformed into the standby state, its display informs the user of the action, and afterwards the display is blank. The mobile communication device is preferably indicating discretely that it is powered on and being in the standby state.

The physical transformation of the mobile communication device when placed in the standby state is suitable for the standby functionality: the device becomes compact and all keys are protected.

Alternatively, the mobile communication device is set to another mode, such as flight mode (the RF functionality is switched off) or a meeting or silent mode (the ring signal is switched off) when being transformed to the standby state.

If the mobile communication device is provided with applications not related to telephony, such as e.g. a music player, a radio tuner, or a camera, these may or may not be operable in the standby state.

The two-directional menu and the transformation of the mobile communication device between different and operational states according to the present invention bring the functionality out to the surface of the mobile communication and thus closer to the user. The invention provides for tangible use and immediate software interaction that supports and compliments the tangibility. The transformation in length is intuitive: the longer the mobile communication device is made, the more active mode is entered. Further, the operation mode can readily bee found by visual or tactile inspection of the mobile communication device.

It shall be appreciated that while the illustrated embodiment comprises three parts, which can be oriented with respect to one another in three different positions to thereby provide three different physical appearances and corresponding operational states of the mobile communication device, the invention is not limited to such version. The number of parts may be two or larger than three, and the number of physical and operational states of the mobile communication device may be two or larger than three, each being associated with a respective operational mode. For instance, four physical states of the mobile communication device may correspond to active, ready, silent, and standby modes as defined above. The parts may be oriented with respect to one another in different positions by means of sliding movements, twisting movements, folding movements, or any combination thereof.

While the above embodiment contains numerous improvements and novel features, most of them can be used separately, in other contexts, or in other kinds of mobile communication devices. It shall thus be appreciated by a person skilled in the art that various changes may be made to the above embodiment without departing from the broader spirit and scope of the invention as set forth in the appended claims. The description and drawings are accordingly to be regarded in an illustrative rather than a restrictive sense.

What is claimed is:

1. A method of operating a mobile communication device comprising:

displaying an array of selectable functions in a first direction on a display of said communication device, each one of the said selectable functions having an associated array of selectable contacts, wherein, for a plurality of the said selectable functions, the said associated array of selectable contacts is the same;

enabling navigation through said displayed array of selectable functions, wherein for each one of the selectable functions, the said associated array of selectable contacts is displayed in a second direction on said display as said selectable functions are navigated;

enabling navigation through said array of selectable contacts;

selecting one of said selectable functions and one of said selectable contacts by halting said navigation of said array of functions and said arrays of selectable contacts at selected positions; and enabling execution of said selected one of said selectable functions for said selected one of said selectable contacts.

2. The method of claim 1 wherein the respective array of selectable contacts is displayed one at a time in the second direction on said display as said selectable functions are navigated.

3. The method of claim 1 wherein said first and second directions are vertical and horizontal directions.

4. The method of claim 1 wherein said selectable functions and said selectable contacts are moved during said navigation.

5. The method of claim 4 wherein said one of said selectable functions and said one of said selectable contacts are selected by moving them to a particular position on the display.

6. The method of claim 5 wherein the position is located at the intersection of the vertical and horizontal arrays.

7. The method of claim 1 wherein the selections of said one of said selectable functions and said one of said selectable contacts are capable of being made in any order.

8. The method of claim 1 wherein some of the contacts in some of said arrays of selectable contacts are differentiated in appearance to indicate that these contacts are frequently used contacts.

9. The method of claim 8 wherein the use pattern of the mobile communication device is registered constantly and some of the contacts in some of the arrays of selectable contacts are automatically differentiated in appearance based on said registered use pattern.

10. The method of claim 1 wherein said selected one of said selectable functions is a call function and said execution of said selected one of said selectable functions for said selected one of said selectable contacts is the placing of a call to said selected one of said selectable contacts.

11. The method of claim 10 wherein a default telephone number is indicated for each of said selectable contacts.

12. The method of claim 11 wherein the placing of the call to said selected one of said selectable contacts is made by using said telephone number.

13. The method of claim 11 wherein an option to select another telephone number than said default telephone number for said one of said selectable contacts is given in response to a user command provided that said one of said selectable contacts has more then one telephone number.

14. The method of claim 10 wherein
said array of selectable contacts for said call function comprises a function for calling a person that does not exist in the list of contacts;
said call function and said function for calling a person that does not exist in the list of contacts are selected by halting said navigation at selected positions; and
said single user command is executed to thereby provide the user with a display area for entering a telephone number of the person that does not exist in the list of contacts.

15. The method of claim 14 wherein a default position of said array of selectable contacts for said call function is taken upon turning on the mobile communication device and said function for calling a person that does not exist in the list of contacts is located at one side of the array of selectable functions and all or all but one of the contacts of said array of selectable contacts for said call function are located at an opposite side of the array of selectable functions.

16. The method of claim 10 wherein an incoming call is answered by said single command.

17. The method of claim 1 wherein said selected one of said selectable functions is a call register function and the array of contacts for said call register function comprises contacts for missed, incoming and outgoing calls, and said execution of said selected one of said selectable functions for said selected one of said selectable contacts is the placing of a call to said selected one of said selectable contacts.

18. The method of claim 1 wherein said selected one of said selectable functions is a message function and said execution of said selected one of said selectable functions for said selected one of said selectable contacts is the displaying of a message editor for preparation of a message with said selected one of said selectable contacts as the intended recipient.

19. The method of claim 18 wherein
said array of selectable contacts for said message function comprises a function for preparing and sending a message to a person that does not exist in the list of contacts;
said message function and said function for preparing and sending a message to a person that does not exist in the list of contacts are selected by halting said navigation at selected positions; and
said single user command is executed to thereby provide the user with a display area for entering a telephone number of the person that does not exist in the list of contacts.

20. The method of claim 1 wherein said selected one of said selectable functions is a message register function and the array of contacts for said call register function comprises contacts for incoming and outgoing messages, and said execution of said selected one of said selectable functions for said selected one of said selectable contacts is the displaying of a message editor for preparation of a message with said selected one of said selectable contacts as the intended recipient.

21. The method of claim 1 wherein
the displaying of the array of selectable functions may be performed in a first and a second operation mode of said mobile communication device;
the selectable functions in the array of selectable functions belong to a first group when said mobile communication device is in the first operation mode; and
the selectable functions in the array of selectable functions belong to a second group when said mobile communication device is in second first operation mode, wherein said first and second groups are different.

22. A non-transitory software storage medium storing a computer program product loadable into the internal memory of a mobile communication device, and comprising software code portions for performing the method of claim 1 when said product is run on said device.

23. A mobile communication device comprising:
means for displaying an array of selectable functions in a first direction on a display of said communication device, each one of the said selectable functions having an associated array of selectable contacts, wherein, for a plurality of the said selectable functions, the said associated array of selectable contacts is the same;
means for enabling navigation through said displayed array of selectable functions, wherein for each one of the selectable functions, the said associated array of selectable contacts is displayed in a second direction on said display as said selectable functions are navigated;
means for enabling navigation through said array of selectable contacts;
means for selecting one of said selectable functions and one of said selectable contacts by halting said navigation of said array of functions and said arrays of selectable contacts at selected positions; and
means for enabling execution of said selected one of said selectable functions for said selected one of said selectable contacts.

24. The method of claim 1, the method comprising:
enabling navigation of said displayed array of selectable functions, wherein the navigation is performed by scrolling; and
enabling navigation of one of said arrays of selectable contacts, wherein the navigation is performed by scrolling.

25. The method of claim 1, further comprising executing said selected one of said selectable functions for said selected one of said selectable contacts by a single user command.

26. The method of claim 1, the method comprising displaying an array of selectable functions in a first direction on a display of said communication device, the functions comprising a combination of two or more of a call function, a message function, a SMS message function, a MMS message function, a facsimile message function, a e-mail message function, a delete contact function allowing contacts to be deleted, an edit contact function allowing contacts to be edited, and a history function containing communication information divided by contacts.

27. The method of claim 1, the method comprising:
enabling navigation through said array of selectable functions; and
enabling navigation through said array of selectable contacts;
wherein the navigation is performed using navigation keys.

28. The method of claim 1 wherein the common array of selectable contacts is displayed in the same order for respective functions.

29. The method of claim 1 wherein the common array of selectable contacts is displayed in a different order for respective functions.

30. A mobile communication device comprising:
a display configured to display an array of selectable functions in a first direction on a display of said communication device, each one of the said selectable functions having an associated array of selectable contacts, wherein, for a plurality of the said selectable functions, the said associated array of selectable contacts is the same;

a navigator configured to enable navigation through said displayed array of selectable functions, wherein for each one of the selectable functions, the said associated array of selectable contacts is displayed in a second direction on said display as said selectable functions are navigated;

a navigator configured to enable navigation through said array of selectable contacts; and a selector configured to enable selection of one of said selectable functions and one of said selectable contacts by halting said navigation of said array of functions and said arrays of selectable contacts at selected positions; and an executor configured to enable the execution of said selected one of said selectable functions for said selected one of said selectable contacts.

* * * * *